(No Model.)

W. HEALE.
PNEUMATIC TIRE.

No. 458,393. Patented Aug. 25, 1891.

WITNESSES:
Ed. C. Hammond
George T. Clark

INVENTOR:
William Heale.
By his Attorney,
Robt. d. Phillips.

UNITED STATES PATENT OFFICE.

WILLIAM HEALE, OF BATTERSEA, ENGLAND.

PNEUMATIC TIRE.

SPECIFICATION forming part of Letters Patent No. 458,393, dated August 25, 1891.

Application filed April 3, 1891. Serial No. 387,475. (No model.)

*To all whom it may concern:*

Be it known that I, WILLIAM HEALE, a subject of the Queen of Great Britain, residing at Battersea, in the county of Surrey, England, have invented an Improvement in Pneumatic or Air-Inflated Tires for the Wheels of Velocipedes and other Road-Carriages; and I do hereby declare the following, when taken in connection with the accompanying drawings, to be a full, clear, and exact description of the same, and which said drawings constitute part of this specification, and represent, in—

Figure 1:
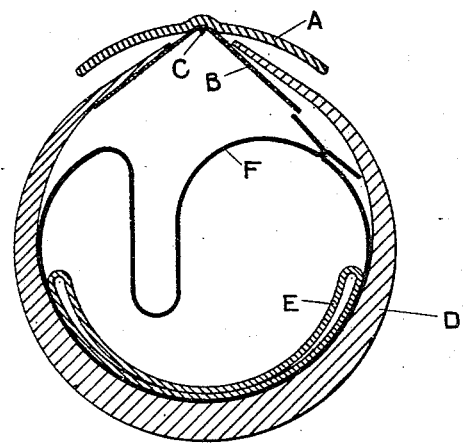
Figure 3:
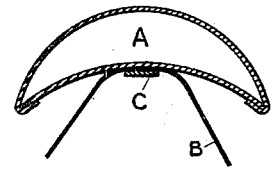
Figure 2:
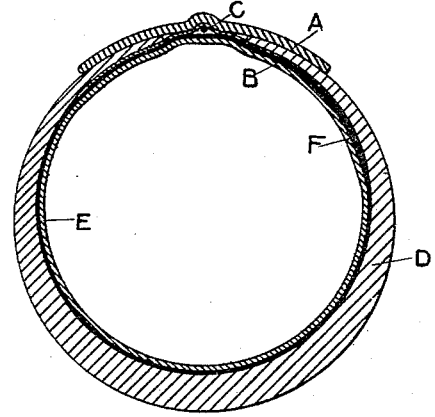

Figure 1, a view in cross-section of a pneumatic or air-inflated tire embodying my invention, the several parts being shown in positions which they may assume when the tire is uninflated, the object being to separate the several parts and show their construction more clearly; in Fig. 2, a view in cross-section of a tire embodying my invention, showing the position of the several parts when the tire is inflated; and in Fig. 3, a view in cross-section of another form my invention may assume.

Throughout these views similar parts are marked with like letters of reference.

My invention relates to an improved method of attaching the outer cover or sheath of a pneumatic or air-inflated tire to the rim of the wheel adapted to carry it, the object being to render the access to the air-tube easier, and thereby facilitate its repair when punctured or otherwise damaged.

The rim A of the wheel is preferably, though not necessarily, of a flat crescent section, either solid or hollow, and of a size proportionate to the tire it is intended to carry. Onto the concave side of the rim A is attached a strip of canvas or similar material B of a width about equal to that of the rim. This strip B is attached circumferentially to the center of the rim by a band C of wire or other suitable metal or material, or it may be fixed to the rim in any other suitable and convenient manner so long as its edges are free, as shown by Fig. 3 of the accompanying drawings. The rim may, if desired, be provided with a central circumferential depression, as shown by Figs. 1 and 2 of the accompanying drawings, for the binder C to lie in.

The outer cover or sheath D is of the ordinary and well-known type; but instead of its edges being attached to the rim A direct they are cemented on the under sides of the strip B, attached to the rim A, the one edge being shown in Fig. 1 of the accompanying drawings so attached and the other not attached.

The air-tube E is of the usual and well-known type, and is provided with any suitable non-return valve passing through the rim A for the purpose of inflation.

The canvas tube F, encircling the air-tube E, is made of a strip of material by sewing the edges together at about half an inch or so from the extreme edges, the said edges being left loose. This canvas tube F is so located round the air-tube that its seam is in close proximity to the one edge of the canvas strip B, as shown by Figs. 1 and 2 of the accompanying drawings.

To get at the air-tube for the purpose of repairing a puncture or other damage, the air-tube is deflated and one side of the outer cover or sheath D is detached from the edge of the strip B to which it is attached, which lays bare the seam of the canvas tube F. This seam can then readily be opened with a knife or pair of scissors, laying bare the air-tube. The puncture or damage being repaired, the seam of the canvas tube F is sewed up and the edge of the outer cover or sheath D cemented to the edge of the strip B, when the tire is ready for use again.

It is found in practice that the pressure of air inside the tire is sufficient to keep the tire in contact with the rim at the edges thereof, the pressure tending to bind the edges of the outer cover D between the edges of the strip B and the rim A. To assist this grip, I sometimes form beads on the edge of the rim by turning over the metal at those parts, as shown by Fig. 3 of the accompanying drawings, and as a further safe-guard, if desired, the parts of the outer sheath or case D in contact with the rim A may be cemented thereto.

I wish it to be particularly understood that I do not limit myself to the precise details of construction hereinbefore set forth and illustrated by the accompanying drawings, but hold myself at liberty to make such changes and alterations as fairly fall within the spirit and scope of my invention.

I am aware that it is not broadly new to make the tires of wheels inflatable, and I therefore do not claim such as my invention; but, Having now particularly described and ascertained the nature of my said invention and in what manner the same is to be performed, what I do claim, and desire to secure by Letters Patent, is—

1. In a pneumatic or air-inflated tire, the combination, with the rim of the wheel, of the strip of canvas attached to the said rim by a central band, and the outer cover adapted to be attached to the said strip of canvas, as set forth.

2. In a pneumatic or air-inflated tire, the combination, with the rim of the wheel, of the strip of canvas attached to the said rim by a central band, the outer cover adapted to be attached to the said strip of canvas, and the canvas tube having a longitudinal seam located at one side, as set forth.

3. The combination, with the outer cover of a pneumatic or air-inflated tire, of a strip of canvas or other suitable material attached centrally to the outer or concave face of the rim of the wheel, but having its edges free, enabling the edges of the outer rubber cover to be attached to the under side of the edges of the strip of canvas or other material, whereby the said edges of the outer cover are held between the edges of the said strip of canvas or other material and the edges of the rim of the wheel when the tire is inflated, as set forth.

4. The combination, with an inflation air-tube, of a canvas tube formed of a strip of material and having its seam made with free edges and located around the said air-tube so that its seam is at the side of the tire, a strip of canvas or other suitable material attached circumferentially or centrally to the outer face of the rim of the wheel so that its edges are free, and an outer cover or sheath adapted to cover the canvas tube inclosing the air-tube and to have its edges attached by cementation to the edges of the strip of canvas or other material attached to the rim of the wheel, as set forth.

In witness whereof I have hereunto signed my name in the presence of two subscribing witnesses.

WILLIAM HEALE.

Witnesses
   ROBT. ED. PHILLIPS,
   EDWARD C. HAMMOND,
*Both of 70 Chancery Lane, London, W. C.*